United States Patent
Lester et al.

(10) Patent No.: US 7,566,436 B2
(45) Date of Patent: Jul. 28, 2009

(54) COUNTER CURRENT MIXING REACTOR

(75) Inventors: Edward Henry Lester, Risley (GB); Barry James Azzopardi, Beeston (GB)

(73) Assignee: The University of Nottingham, Nottingham (GB)

( * ) Notice: Subject to any disclaimer, the term of this patent is extended or adjusted under 35 U.S.C. 154(b) by 220 days.

(21) Appl. No.: 10/589,311

(22) PCT Filed: Feb. 11, 2005

(86) PCT No.: PCT/GB2005/000483

§ 371 (c)(1),
(2), (4) Date: Apr. 20, 2007

(87) PCT Pub. No.: WO2005/077505

PCT Pub. Date: Aug. 25, 2005

(65) Prior Publication Data

US 2007/0206435 A1    Sep. 6, 2007

(30) Foreign Application Priority Data

Feb. 11, 2004    (GB) .................. 0402963.3

(51) Int. Cl.
| | |
|---|---|
| *C01F 17/00* | (2006.01) |
| *C01G 3/02* | (2006.01) |
| *C01G 5/00* | (2006.01) |
| *C01G 11/00* | (2006.01) |
| *C01G 23/047* | (2006.01) |
| *C01G 25/02* | (2006.01) |
| *C01G 49/02* | (2006.01) |
| *C01G 55/00* | (2006.01) |
| *C01G 57/00* | (2006.01) |
| *B82B 1/00* | (2006.01) |
| *B82B 3/00* | (2006.01) |

(52) U.S. Cl. ............ 423/592.1; 423/21.1; 423/22; 423/23; 423/69; 423/99; 423/138; 423/263; 423/593.1; 423/594.18; 423/604; 423/608; 423/610; 423/632; 423/633; 977/700; 977/773; 977/810; 977/811; 977/813; 977/940; 977/895; 977/900

(58) Field of Classification Search ............ 423/21.1, 423/22, 23, 69, 99, 138, 263, 592.1, 593.1, 423/594.18, 604, 608, 610, 632, 633; 977/700, 977/773, 810, 811, 813, 840, 895, 900
See application file for complete search history.

(56) References Cited

U.S. PATENT DOCUMENTS 2,692,764 A    10/1954    Hanson (Continued)

FOREIGN PATENT DOCUMENTS

| DE | 203 06 915 U1 | 8/2003 |
|---|---|---|
| EP | 0 528 201 B1 | 2/1983 |
| EP | 1 358 931 A2 | 11/2003 |

OTHER PUBLICATIONS

Adschiri et al., "Hydrothermal Synthesis of Metal Oxide Nanoparticles at Supercritical Conditions", Journal of Nanoparticle Research, 2001, pp. 227-235, vol. 3, Kluwer Academic Publishers, The Netherlands.

(Continued)

*Primary Examiner*—Timothy C Vanoy
*Assistant Examiner*—Serena L Hanor
(74) *Attorney, Agent, or Firm*—Foley & Lardner LLP

(57) ABSTRACT

A mixing reactor for mixing efficiently streams of fluids of differing densities. In a preferred embodiment, one of the fluids is supercritical water, and the other is an aqueous salt solution. Thus, the reactor enables the production of metal oxide nanoparticles as a continuous process, without any risk of the reactor blocking due to the inefficient mixing inherent in existing reactor designs.

21 Claims, 3 Drawing Sheets

A schematic of the funnel reactor geometry

CONFIGURATION OF THE NOZZLE REACTOR

U.S. PATENT DOCUMENTS

| | | | |
|---|---|---|---|
| 2,768,123 | A | 10/1956 | Trusty et al. |
| 3,726,297 | A | 4/1973 | Heimann et al. |
| 4,963,329 | A | 10/1990 | Burgess et al. |
| 6,440,337 | B1 * | 8/2002 | Hanna et al. .................. 264/11 |
| 2003/0047824 | A1 | 3/2003 | Hanna et al. |
| 2003/0109421 | A1 | 6/2003 | Palakodaty et al. |

OTHER PUBLICATIONS

Adschiri et al., "Rapid and Continuous Hydrothermal Crystallization of Metal Oxide Particles in Supercritical Water", J. Am Ceram. Soc., 1992, pp. 1019-1022, vol. 75, Issue 4, American Ceramic Society, USA.

Cabanas et al., "Continuous Hydrothermal Synthesis of Inorganic Materials in a Near-Critical Water Flow reactor; The One-Step Synthesis of Nano-Particulate $Ce_{1-x}Zr_xO_2(x=01-)$ Solid Solutions", J. Mater. Chem., 2001, pp. 561-568, vol. 11, The Royal Society of Chemistry.

Cote et al., "Continuous Hydrothermal Synthesis and Crystallization of Magnetic Oxide Nanoparticles", J. Mater. Res., Sep. 2002, pp. 2410-2416, vol. 17, No. 9, Materials Research Society.

Galkin et al., "Continuous Reactions in Supercritical Water: A New Route to $La_2CuO_4$ with a High Surface Area and Enhanced Oxygen Mobility", Angew. Chem. Int. Ed., 2000, pp. 2738-2740, vol. 39, No. 15, Wiley-VCH Verlag GmbH, Germany.

Hao et al., Continuous Hydrothermal Crystallization of $\alpha$-$Fe_2O_3$ and $Co_3O_4$ Nanoparticles, J. Mater. Res., Feb. 2003, pp. 415-422, vol. 18, No. 2, Materials Research Society.

Viswanathan et al., "Formation of Zinc Oxide Nanoparticles in Supercritical Water", J. Supercritical Fluids, 2003, pp. 187-193, vol. 27, Elsevier.

Viswanathan et al., "Formation of Zinc Oxide —Titanium Dioxide Composite Nanoparticles in Supercritical Water", Ind. Eng. Chem. Res., 2003, pp. 5535-5540, vol. 42, American Chemical Society.

Adschiri et al., "Hydrothermal Synthesis of Metal Oxide Fine Particles at Supercritical Conditions", Ind. Eng. Chem, Res., 2000, pp. 4901-4907, vol 39, American Chemical Society, USA.

Adschiri et al., "Hydrothermal Synthesis of Metal Oxide Nanoparticles at Supercritical Conditions", Journal of Nanoparticle Research, 2001, pp. 227-235, vol. 3, Kluwer Academic Publishers, The Netherlands.

Adschiri et al., "Rapid and Continuous Hydrothermal Crystallization of Metal Oxide Particles in Supercritical Water", J. Am Ceram. Soc., 1992, pp. 1019-1022, vol. 75, Issue 4, American Ceramic Society, USA.

Cabanas et al., "Continuous Hydrothermal Synthesis of Inorganic Materials in a Near-Critical Water Flow reactor; The One-Step Synthesis of Nano-Particulate $Ce_{1-x}Zr_xO_2(x=01-)$ Solid Solutions", J. Mater. Chem., 2001, pp. 561-568, vol. 11, The Royal Society of Chemistry.

* cited by examiner

Figure 1: Existing T- and Y- shaped reactors
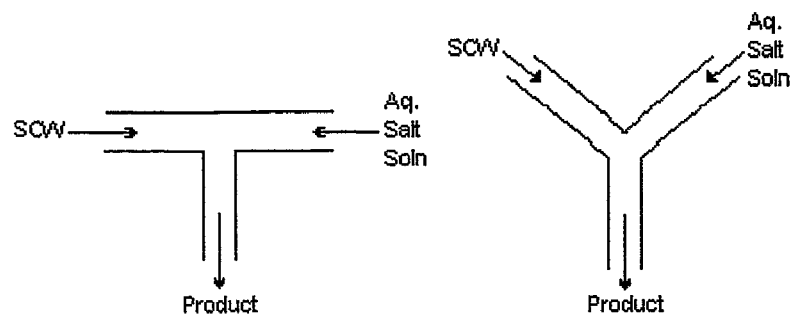
Figure 2 – A schematic of the funnel reactor geometry
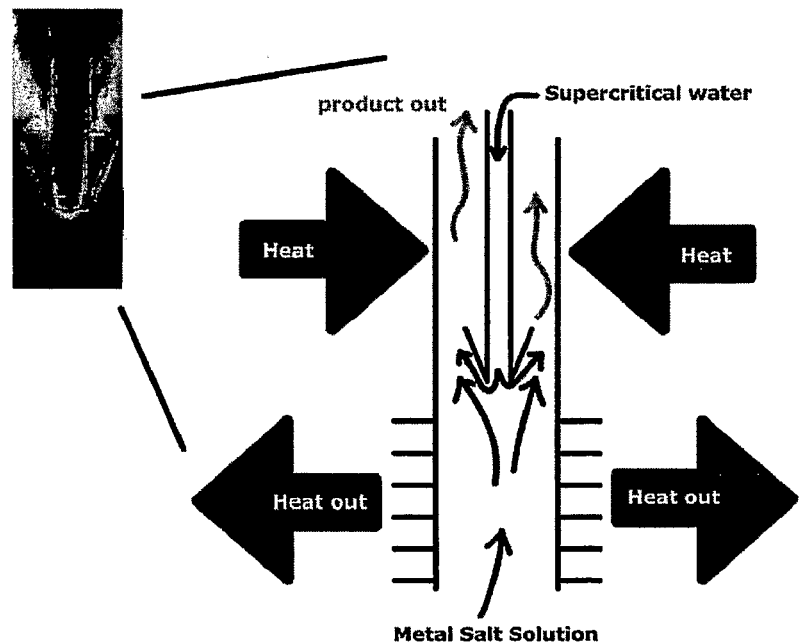

Figure 3 – A diagram of the funnel shaped supercritical outlet
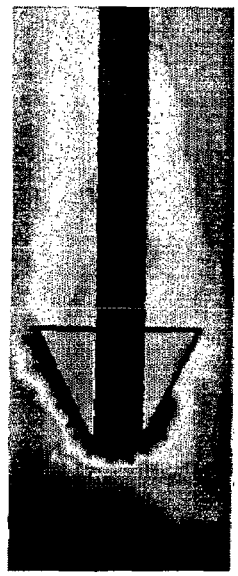
Figure 4 - Schematic representation of a rig which incorporates the mixing reactor of the invention allowing continuous production of particles.
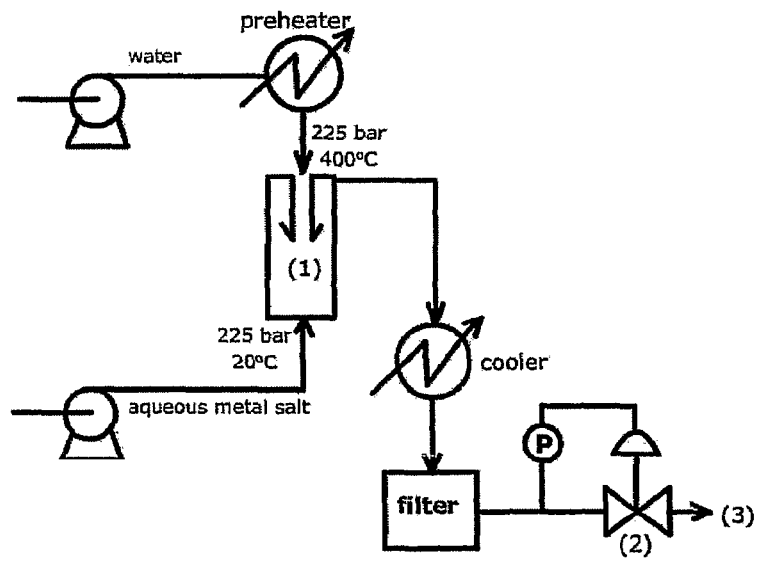

Figure 5 - The relationship between surface areas and metal salt flow rate
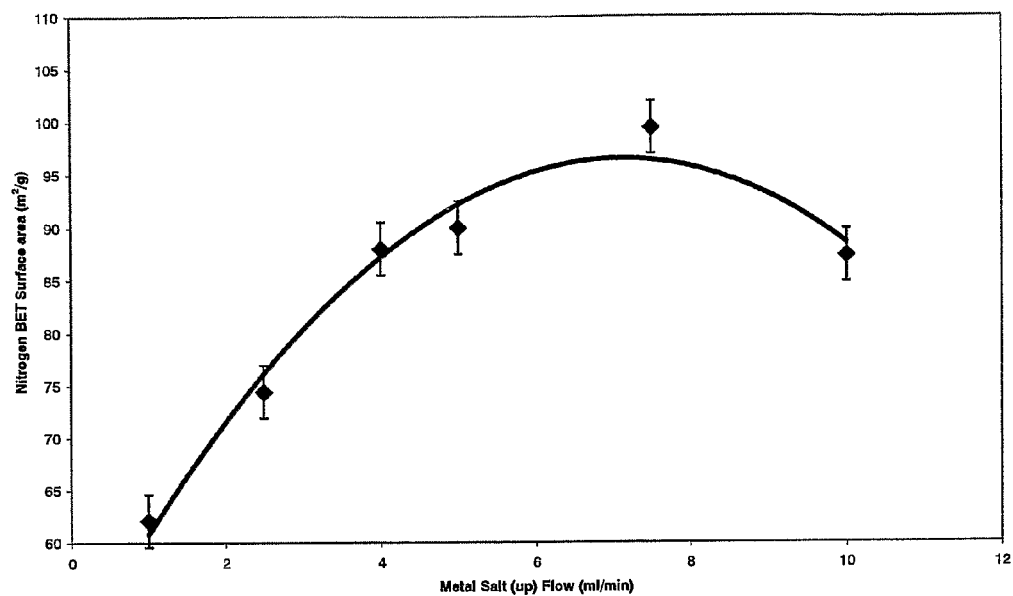
Figure 6 - The relationship between surface areas and internal reactor temperature
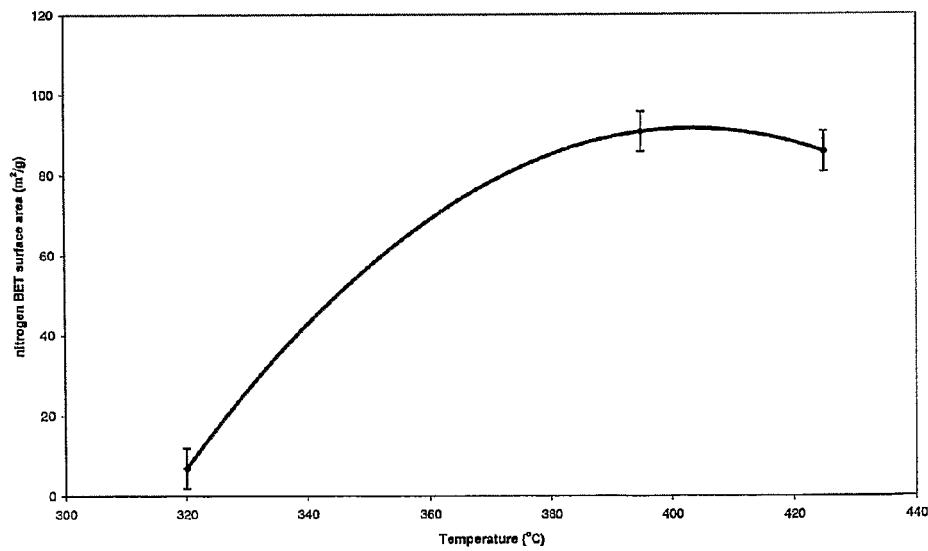

COUNTER CURRENT MIXING REACTOR

This application is the U.S. national phase of PCT Application No. PCT/GB05/00483 filed on Feb. 11, 2005, which claims priority under 35 USC 119 to British Patent Application No. 0402963.3 filed on Feb. 11, 2004, the contents of which are herein incorporated by reference in their entirety.

FIELD OF THE INVENTION

The invention is a counter current mixing reactor enabling the efficient mixing of streams of fluid. More specifically, one stream may be of a heated, pressurised or supercritical fluid whilst another is of a denser fluid. More preferably, one stream may be of supercritical water ($scH_2O$), and another is of a metal containing solution. Most preferably, the invention can be used in the continuous synthesis of nanoparticles of metals or metal oxides in high temperature water without blockage of pipeworks and with improved control of particle size and shape compared to previous designs of reactor.

BACKGROUND OF THE INVENTION

Metal and metal oxide particles with nanometer scale dimensions have a wide range of uses, including (but not limited to) catalysts, pigments, polishes, ultraviolet absorbers and in ceramics. It is well known that such particles can be formed by chemical reaction of aqueous solutions of metal salts with heated, pressurised or supercritical water. In principle, this methodology offers distinct advantages over other methods of nanoparticle creation in terms of cost and viability as it allows the reaction to be performed as a continuous process. However it is difficult to perform this reaction on a commercial scale utilising current methods because existing reactor configurations do not allow the precipitation reaction to be controlled effectively leading to frequent blockage of the reactor and inadequate control of particle size and shape. Hence within this process, the design of the reactor where the water and the salt solution mix is of crucial importance to the size and properties of the nanoparticles produced.

The invention details a more efficient and versatile method of producing a range of nanoparticles of metal and metal oxides that could be catalytically active, and thus clearly possesses industrial applicability.

Particle size can be important for catalytic processes and other uses, and is dependant on the nature of the metal and also the intended application. For example commercially useful cerium oxide (from Johnson Matthey) has a surface area of 250 $m^2/g$ whereas silver particulate with a lower surface area, 60-100 $m^2/g$, is also commercially useful. Without optimisation, the reactor of the invention has produced particulates of $CeO_2$ with surface areas of 100 $m^2/g$. This could, in principle, be improved considerably with additional work focussed on lowering the particle sizes produced by adjusting the operating conditions and metal salt concentrations.

Whilst the surface area of a catalyst is very important, the physical nature of the particles can also determine their success in the intended application. For example, zirconium oxide nanoparticulates are often amorphous in structure, which is not an appropriate form for many catalytic applications. The reactor of the invention has prepared crystalline $ZrO_2$, which is much more useful.

Supercritical fluids, and particularly supercritical water, have been used to produce metal nanoparticles (Adschiri, Kanazawa et al. 1992; Adschiri, Hakuta et al. 2000; Galkin, Kostyuk et al. 2000; Adschiri, Hakuta et al. 2001; Cabanas, Darr et al. 2001; Cote, Teja et al. 2002; Hao and Teja 2003; Viswanathan and Gupta 2003; Viswanathan, Lilly et al. 2003) however the existing methodologies all use variants on either a T- or a Y-shaped reactor (FIG. 1).

A major limitation of these methods is that the location of the precipitation of the particles is not controlled. Particles are known to precipitate readily in reactor pipework, especially inlet pipes. The T piece reactors have been found to block frequently at the denser fluid inlet, resulting in costly and inconvenient down time being required for reactor cleaning and reassembly. These blockages can occur within minutes of the denser fluid feed reaching the T piece. Additionally, if the system is under pressure there are obvious health and safety implications associated with frequent blockages (i.e. increased risk of explosion). The invention consists of a novel design of reactor that largely eliminates these problems.

STATEMENT OF INVENTION

Thus, according to a first aspect of the invention there is provided a counter current mixing reactor for continuously mixing two or more fluids of differing densities comprising a first inlet and an outlet characterised in that one or more further inlets are diametrically opposed to the first inlet and are disposed within the outlet.

The principle advantage of the invention is that the mixing reactor exploits the differences in density between the fluids to avoid premixing or stagnation thus minimising blockage of the pipework or reactor. This is the main problem with other reactor configurations and is caused by back mixing in the inlets to the mixer. This causes particulate formation upstream of the mixing point and consequent flow restriction and eventual blockage of the reactor. The invention eliminates this by removing the potential for mixing to occur in the inlets of the reactor.

It will be appreciated that references to 'differing densities' include differences in the order of greater than 5%, 10%, 20%, 50%, 100%, 500% or ranges between any of these values.

In one embodiment of the invention, there is provided a counter current mixing reactor for continuously mixing two fluids comprising a first inlet and an outlet characterised in that a further inlet is diametrically opposed to the first inlet and is disposed within the outlet.

Preferably, the one or more further inlets are co-axially disposed within the outlet.

In a further embodiment of the invention, there is provided a first conduit adapted to contain a reaction fluid flowing in a first direction, and an outlet of a second conduit adapted to contain a second reaction fluid, said outlet having at least a component of which facing in a direction generally opposite to said first direction, and said outlet being disposed in said first conduit.

It will be appreciated that references to 'generally opposite' refer to angles ranging from sideways (45°) to diametrically opposed (180°).

In a yet further embodiment of the invention, the counter current mixing reactor is arranged in a vertical configuration. In such a configuration the fluid of lower density may be introduced into the upper inlet and thus may be mixed with a fluid of higher density introduced into the lower inlet.

Preferably, at least one of the fluids is in the sub, near critical or supercritical state. It will be appreciated that references to supercritical fluid include hydrocarbons (e.g. acetone), water or a dense phase gas. More preferably, at least one of the fluids e.g. the fluid of lower density, is heated, pressurised or supercritical water.

Preferably, the fluid of lower density e.g. heated, pressurised or supercritical water, is kept hot using a heater around the outlet. This is advantageous because it allows the reactions to continue beyond the initial mixing point, thereby improving the quality or quantity of the product particles.

Preferably, at least one of the fluids is a solution of a metal salt or compound, more preferably an aqueous solution of a metal salt or compound, most preferably, a transition metal salt solution. Particularly preferably, at least one of the fluids e.g. the fluid of higher density, is an aqueous metal salt solution of the metals selected from transition metals including ruthenium, cadmium, rhodium, palladium, iron, cerium, titanium, zirconium, copper and silver, especially preferably, the metal salt is an oxide.

The fluid of higher density is preferably cooler than the fluid of lower density. To achieve this, the fluid of higher density is cooled prior to introduction to the mixing reactor and/or the fluid of lower density is warmed prior to introduction to the mixing reactor.

The advantage of cooling the fluid of higher density e.g. the metal salt solution, is that it allows the metal salt to remain relatively cool until mixing occurs. Thus, no preheating of the metal salt solution occurs. This both saves on energy and removes the possibility that increasing the temperature of the salt stream will cause the metal salt to precipitate prematurely. This is known to happen for certain metal salts e.g. copper salts can precipitate out of solution if the bulk temperature of the metal salt solution is over 50-60° C. The tendency for premature precipitation depends partly on the metal salt and also it's concentration in solution. Furthermore, the rapid heating of the metal salt solution on contact with the much hotter supercritical $H_2O$ stream instantaneously causes particles to form. Additionally, the invention eliminates the problems of blockage experienced with previous reactor designs by keeping the aqueous salt stream cold and preventing mixing or interaction of this aqueous stream until it reaches the region in which the chemical reaction occurs. This surprisingly controls the precipitation and localises it at the point of the chemical reaction. An additional benefit is that the cold salt solution can also act as effective heat sink, removing the heat from an exothermic reaction.

Preferably, the fluid of higher density e.g. metal salt solution, is cooled using a heat sink. The advantage of using a heat sink around the metal salt inlet is to ensure efficient heat dissipation away from the reaction—this is not practical with most existing reactor designs which cannot be cooled without hindering the mixing of the two streams.

It will be appreciated that regardless of whether the fluid of higher density is cooled or the fluid of lower density is heated, there is preferably a temperature differential between the two fluid streams. Ideally, such a temperature differential will be in the order of greater than 50, 100, 200, 300, 400 or 500° C. or ranges between any of these values. Most preferably, the temperature differential is 380° C.

In a further embodiment of the invention, the one or more further inlets comprise a shaped nozzle, for example, a conical funnel.

The funnel configuration allows a controlled and symmetrical mixing of the two streams. This is a marked contrast to the current state of the art, where a T-piece is commonly used to mix the two streams. It should be noted that the funnel is not an essential part of the design, since the reactor can be run with only a pipe. However, the funnel aids the mixing of the two solutions and allows more consistent particle size and morphology to be obtained than if the inlet is only a pipe. The T-piece favoured in the prior art did not create uniform mixing across the inlets into the mixing zone, resulting in frequent reactor blockage and consequent down time.

Preferably, the two or more fluid streams are mixed under pressure. More preferably, the two or more fluid streams are pressurised to the order of 50, 100, 200, 300 or 400 bar or ranges between any of these values. Most preferably, the two or more fluid streams are pressurised to 225 bar.

As a second aspect of the invention there is provided a mixing chamber comprising one or more mixing reactors of the invention arranged in series. This arrangement has the advantage of allowing consecutive mixing of two or more fluids for further refinement of particle size.

As a third aspect of the invention, there is provided a process for preparing metal nanoparticles which comprises delivery of a metal salt solution through a first inlet of a mixing reactor according to the invention and delivery of a fluid in the sub, near critical or supercritical state (e.g. supercritical water) through a further inlet diametrically opposed to the first inlet wherein said further inlet is disposed within an outlet such that the mixed solutions exit the reactor once mixed.

The more efficient mixing provided by the invention allows the production of metal oxide nanoparticles with surface areas significantly higher than previously observed. For example, $ZrO_2$ nanoparticles have been produced by the process of the invention with a relatively high surface area of 200 $m^2/g$ which could potentially increase their catalytic activity. Metal and metal oxides that have been previously difficult to produce have been prepared in the reactor of the invention with significantly reduced blocking, e.g. silver, at around 60 $m^2/g$. This demonstrates that a broader range of potential nanoparticulates metal based catalysts could be produced in the mixing reactor of the invention than in existing designs of equipment.

As a fourth aspect of the invention, there is provided a process for preparing metal nanoparticles which comprises mixing a solution of supercritical water with an aqueous metal (e.g. transition metal) salt solution, characterised in that the aqueous metal salt solution is cooled prior to mixing.

As a fifth aspect of the invention, there is provided metal nanoparticles obtainable by a process as defined herein. Preferably, the particles obtained are a mixture of two or more metals.

BRIEF DESCRIPTION OF THE DRAWINGS

FIG. 1: Schematic representation of commonly known T- and Y-shaped reactors.

FIG. 2: Schematic representation of the counter current mixing reactor of the invention.

FIG. 3: Schematic representation of the funnel arrangement within the counter current mixing reactor of the invention generated by CFD modelling.

FIG. 4: Schematic representation of a rig which incorporates the counter current mixing reactor of the invention allowing continuous production of particles.

FIG. 5: Graph demonstrating the effect of increasing flow rate upon the surface area of resultant particles.

FIG. 6: Graph demonstrating the effect of increasing temperature upon the surface area of resultant particles.

DESCRIPTION OF THE INVENTION

Referring first to FIG. 2, the aqueous stream is introduced into the bottom of the reactor, where it is cooled, preferably by a heat sink. The solution is forced under pressure in an upwards direction. The supercritical water is introduced into the reactor in the opposite direction—i.e. downwards. The scH$_2$O is less dense than the aqueous stream, and thus rises upwards in the reaction chamber, becoming intimately mixed with the aqueous salt solution as it does so. This mixing is highly efficient, and results in the generation of metal oxide nanoparticles that can be separated downstream from the aqueous effluent.

This design takes advantage of the density differential between the two reactant streams (i.e. the scH$_2$O and the cold aqueous salt solution). This differential creates a strong, desirable mixing environment within the reactor and induces strong eddies downstream of the mixing point. These eddies are desirable as they help to disperse the metal oxide particles and carry them away such that they do not block the reactor.

In a preferred embodiment the reactor incorporates a funnel as shown in FIG. 3. This aids the mixing of the reactants, and avoids a pulsing phenomenon associated with the mixing downstream. As the scH$_2$O is less dense and is therefore more buoyant than the cold solution into which it is flowing a film of scH$_2$O forms on the surface of the funnel. This film mixes very efficiently with the colder aqueous solution flowing past it, and this has a beneficial effect on the kinetics of the reaction between the scH$_2$O and the aqueous solution.

FIG. 4 is a flow diagram of a rig incorporating the mixing reactor of the invention generally as 1. The rig comprises a preheater oven which heats water to a temperature of 400° C. The water stream is then pumped from a first reservoir containing water under a pressure of 225 bar to an upper inlet by a Gilson HPLC pump. Simultaneously, a stream of an aqueous metal salt is pumped from a second reservoir containing aqueous metal salt under a pressure of 225 bar through a lower inlet by an additional Gilson HPLC pump at room temperature. Following mixing, the mixed streams pass through a water cooler which functions to cool the stream before being filtered under pressure by a pressure transducer 2 regulated by a Tescom back-pressure regulator. Following filtration under pressure, nanoparticles 3 may then be collected.

The invention will now be described with reference to the following non-limiting Examples:

EXAMPLE 1

The Production of Nanoparticulate CeO$_2$

Reaction Scheme:
The following reaction was carried out using the mixing reactor of the invention incorporated into a rig configuration shown in FIG. 4.

Hydrolysis: Ce(NO$_3$)$_4$+4H$_2$O→Ce(OH)$_{4(s)}$+4HNO$_3$

Dehydration: Ce(OH)$_4$→CeO$_2$+2H$_2$O

System pressure was set to 228 bar. The metal salt solution (Ce(NO$_3$)$_4$, (0.2 M)) was flowed at 5 ml/min through the reactor. A total of 250 ml of the metal salt solution was used during the course of the 50 min run. The scH$_2$O was flowed at 10 ml/min through the reactor at a temperature of 400° C. The reactor was maintained at a temperature of 370° C. using a band heater for the duration of the reaction.

The high pressure pumps and back pressure regulator system allow the pressure to be maintained throughout the rig and then to be reduced at the end allowing liquid product to be released at ambient temperature and pressure. The rig, using the invention can be run for hours without blocking producing 2-5 g per hour of the metal oxide.

A selection of other results obtained from the mixing reactor of the invention using similar flow and concentration conditions as described above is shown in Table 1 below:

TABLE 1

| Metal Type | BET surface area | Average Particle Size (either from XRD or surface area calculation) |
|---|---|---|
| TiO$_2$ | 113 m$^2$/g | 13 nm |
| CeO$_2$ | average 100 m$^2$/g | 9 nm |
| ZrO$_2$ | 194 m$^2$/g | 6 nm |
| ZnO | 16.5 m$^2$/g | 64 nm |
| CuO/Cu$_2$O/Cu | 10-20 m$^2$/g | 50 nm |
| Cu$_{0.5}$Zn$_{0.5}$O$_2$ | 55 m$^2$/g | 15 nm |
| Fe$_2$O$_3$ | 218 m$^2$/g | 21 nm |
| Ag | 60 m$^2$/g | 9 nm |

EXAMPLE 2

Control Over Surface Area with Flow Rate within the Reactor

FIG. 5 shows the effect of increasing flow rate of cerium nitrate up through the reactor. Clearly there is an interesting trend of increasing surface area (from 65 m$^2$/g up to 100 m$^2$/g) with increasing metal salt flow up to a value of 8 ml/min beyond which the particle size begins to decrease. It is possible that the increase is caused by the relationship between flow velocity and reaction kinetics and the decrease is caused by an 'excess' of metal salt resulting in larger particles being produced.

EXAMPLE 3

Control Over Surface Area with Temperature within the Reactor

One area of interest is the effect of the operating temperature within the reactor and it's impact on surface area. The reactor can be heated externally to any given temperature sub, near or super critical, the relationship between surface area (and indirectly, particle size) and operating temperature can be established. Even though the heated water inlet inside the reactor may be operating sub critical, the temperature differential between the metal salt and the heated water still exists and this will cause the inlet flow to turn upwards into the downstream outlet of the pipe, as shown in FIG. 2.

FIG. 6 is a graph showing how surface area increases significantly with operating temperature. This indicates that the particle size (and possibly the morphology) can be tailored by adjusting the operating conditions of the reactor.

REFERENCES

Adschiri, T., Y. Hakuta, et al. (2000). "Hydrothermal synthesis of metal oxide fine particles at supercritical conditions." *Industrial & Engineering Chemistry Research* 39(12): 4901-4907.

Adschiri, T., Y. Hakuta, et al. (2001). "Hydrothermal synthesis of metal oxide nanoparticles at supercritical conditions." *Journal of Nanoparticle Research* 3(2-3): 227-235.

Adschiri, T., K. Kanazawa, et al. (1992). "Rapid and Continuous Hydrothermal Crystallization of Metal-Oxide Particles in Supercritical Water." *Journal of the American Ceramic Society* 75(4): 1019-1022.

Cabanas, A., J. A. Darr, et al. (2001). "Continuous hydrothermal synthesis of inorganic materials in a near-critical water flow reactor; the one-step synthesis of nano-particulate Ce1-xZrxO2 (x=0-1) solid solutions." *Journal of Materials Chemistry* 11(2): 561-568.

Cote, L. J., A. S. Teja, et al. (2002). "Continuous hydrothermal synthesis and crystallization of magnetic oxide nanoparticles." *Journal of Materials Research* 17(9): 2410-2416.

Galkin, A. A., B. G. Kostyuk, et al. (2000). "Continuous reactions in supercritical water: A new route to La2CuO4 with a high surface area and enhanced oxygen mobility." *Angewandte Chemie-International Edition* 39(15): 2738-2740.

Hao, Y. L. and A. S. Teja (2003). "Continuous hydrothermal crystallization of alpha-Fe2O3 and Co3O4 nanoparticles." *Journal of Materials Research* 18(2): 415-422.

Viswanathan, R. and R. B. Gupta (2003). "Formation of zinc oxide nanoparticles in supercritical water." *Journal of Supercritical Fluids* 27(2): 187-193.

Viswanathan, R., G. D. Lilly, et al. (2003). "Formation of zinc oxide-titanium dioxide composite nanoparticles in supercritical water." *Industrial & Engineering Chemistry Research* 42(22): 5535-5540.

The invention claimed is:

1. A counter current mixing reactor for continuously mixing two or more fluids of differing densities comprising a first inlet and an outlet characterized in that one or more further inlets are diametrically opposed to the first inlet and are disposed within the outlet, wherein at least one of the fluids is in the subcritical, near critical or supercritical state.

2. A mixing reactor as defined in claim 1 comprising a first inlet and an outlet characterized in that a further inlet is diametrically opposed to the first inlet and is disposed within the outlet.

3. A mixing reactor as defined in claim 1 arranged in a vertical configuration.

4. A mixing reactor as defined in claim 1 wherein at least one of the fluids is heated, pressurized or supercritical water.

5. A mixing reactor as defined in claim 1 wherein at least one of said fluid is an aqueous solution of a metal salt or compound wherein said metal is selected from transition metals including ruthenium, cadmium, rhodium, palladium, iron, cerium, titanium, zirconium, copper and silver.

6. A mixing reactor as defined in claims 1 wherein said fluid of higher density is cooler than said fluids of lower density.

7. A mixing reactor as defined in claim 1 wherein said on or more further inlets comprise a shaped nozzle, for example, a conical funnel.

8. A process for preparing metal or metal oxide nano-particles which comprises delivery of a metal salt solution through a first inlet of a mixing reactor as defined in claim 1 and delivery of a fluid in the subcritical, near critical or supercritical state through a further inlet diametrically opposed to said first inlet wherein said further inlet is disposed within an outlet such that the mixed solutions exit said reactor once mixed.

9. A process as defined in 8 wherein said metal salt solution is cooled prior to mixing.

10. Metal or metal oxide nano-particles obtainable by a process as defined in claim 8.

11. A device capable of mixing two fluids of differing densities having a downwardly facing outlet for less dense fluid and inlet for more dense fluid adapted to cause an upwards flow of said more dense fluid in use, the arrangement being such that said less dense fluid is introduceable into the device in a downwards orientation relative to the upwards flow of said denser fluid.

12. A device as specified in claim 11, characterized by said inlet of said less dense fluid having a conical nozzle to aid mixing of said fluids.

13. A device specified in claim 11, in which the denser of said two solutions is cooled prior to entry into said device.

14. A method of mixing two fluids of different densities, comprising:
   providing a device with a downwardly facing outlet for processing flow of less dense fluid;
   further providing an inlet for processing flow of more dense fluid and the device causing an upward flow of said more dense fluid; and
   introducing said less dense fluid into the device in a downwards orientation relative to the upwards flow of said more dense fluid, the less dense fluid and the more dense fluid being mixed within the device.

15. The method of claim 14 wherein one of said fluids is at least one of near critical and supercritical water.

16. The method of claim 14 wherein the step of mixing produces a nano-particulate cerium oxide.

17. The method of claim 14 wherein the step of mixing produces a nano-particulate titanium oxide.

18. The method of claim 14 wherein the step of mixing produces a nano-particulate zirconium oxide.

19. The method as defined in claim 14 wherein the step of mixing produces a nano-particulate copper oxide.

20. The method as defined in claim 14 wherein the step of mixing produces a nano-particulate silver oxide.

21. The method as defined in claim 14 wherein the step of mixing produces mixed metal oxides.

* * * * *